US011255006B2

(12) United States Patent
Lu et al.

(10) Patent No.: US 11,255,006 B2
(45) Date of Patent: Feb. 22, 2022

(54) STEEL ALLOY WORKPIECE AND A METHOD FOR MAKING A PRESS-HARDENED STEEL ALLOY COMPONENT

(71) Applicant: GM Global Technology Operations LLC, Detroit, MI (US)

(72) Inventors: Qi Lu, Shanghai (CN); Yang Guo, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 279 days.

(21) Appl. No.: 16/509,001

(22) Filed: Jul. 11, 2019

(65) Prior Publication Data

US 2020/0157665 A1 May 21, 2020

(30) Foreign Application Priority Data

Nov. 16, 2018 (CN) ......................... 201811372065.3

(51) Int. Cl.
*C22C 38/34* (2006.01)
*C22C 38/38* (2006.01)
*C25D 13/20* (2006.01)
*C21D 9/46* (2006.01)

(52) U.S. Cl.
CPC .............. *C22C 38/34* (2013.01); *C22C 38/38* (2013.01); *C25D 13/20* (2013.01); *C21D 9/46* (2013.01)

(58) Field of Classification Search
CPC ......... B32B 15/012; C21D 9/46; C22C 38/02; C22C 38/04; C22C 38/32; C22C 38/34; C22C 38/38; C25D 13/12; C25D 13/20
See application file for complete search history.

(56) References Cited

U.S. PATENT DOCUMENTS

| | | | |
|---|---|---|---|
| 6,296,805 | B1 | 10/2001 | Laurent et al. |
| 8,252,125 | B2 | 8/2012 | Giefers et al. |
| 8,440,323 | B2 | 5/2013 | Spehner et al. |
| 8,614,008 | B2 | 12/2013 | Canourgues et al. |
| 8,733,142 | B2 | 5/2014 | Spehner et al. |
| 8,778,261 | B2 | 7/2014 | Nakamura et al. |

(Continued)

FOREIGN PATENT DOCUMENTS

| | | |
|---|---|---|
| CN | 1087846 A * | 6/1994 |
| CN | 1087846 A | 6/1994 |

(Continued)

*Primary Examiner* — Jenny R Wu
(74) *Attorney, Agent, or Firm* — Vivacqua Crane PLLC

(57) ABSTRACT

A steel alloy workpiece and a method for making a press-hardened steel (PHS) component using the steel alloy workpiece is provided. The steel alloy workpiece includes between about 1.0 and 5.0 weight percent chromium, between about 0.5 and 2.0 weight percent silicon, and a surface having a predetermined imprinted pattern. The imprinted pattern includes one of a plurality of overlapping nested sinusoidal waves and a honey-comb pattern, and ascribes a surface roughness of between about 1.0 microns and 2.5 microns. The method includes providing the steel alloy workpiece, heating the workpieces at a predetermined time and temperature, hot stamping the workpieces into the PHS component, quenching the PHS component at a predetermined quench rate, and e-coating the PHS component. The e-coating is applied directly onto the surface of the PHS component.

8 Claims, 4 Drawing Sheets

(56) References Cited

U.S. PATENT DOCUMENTS

| | | | |
|---|---|---|---|
| 8,932,416 | B2 | 1/2015 | Nakanishi et al. |
| 8,992,697 | B2 | 3/2015 | Matsuda et al. |
| 9,359,663 | B2 | 6/2016 | Mizuta et al. |
| 9,475,113 | B2 | 10/2016 | Naitou et al. |
| 9,512,499 | B2 | 12/2016 | Tomokiyo et al. |
| 9,593,392 | B2 | 3/2017 | John et al. |
| 9,598,745 | B2 | 3/2017 | Hayashi et al. |
| 9,605,329 | B2 | 3/2017 | Nonaka et al. |
| 9,611,518 | B2 | 4/2017 | Naitou et al. |
| 9,617,624 | B2 | 4/2017 | Tanahashi et al. |
| 9,644,247 | B2 | 5/2017 | Matsuda et al. |
| 9,725,782 | B2 | 8/2017 | Nonaka et al. |
| 9,840,751 | B2 | 12/2017 | Hayashi et al. |
| 9,850,554 | B2 | 12/2017 | Naitou et al. |
| 9,896,736 | B2 | 2/2018 | Tomokiyo et al. |
| 9,920,407 | B2 | 3/2018 | Nonaka et al. |
| 9,945,013 | B2 | 4/2018 | Nonaka et al. |
| 10,029,294 | B2 | 7/2018 | Yamano et al. |
| 10,030,280 | B2 | 7/2018 | Hayashi et al. |
| 10,072,324 | B2 | 9/2018 | Nonaka et al. |
| 2015/0209848 | A1* | 7/2015 | Kopplin .................. B21B 1/227 428/659 |
| 2020/0368798 | A1* | 11/2020 | Chen ......................... B21B 1/26 |

FOREIGN PATENT DOCUMENTS

| | | | | |
|---|---|---|---|---|
| JP | 03077730 | A | * | 4/1991 |
| JP | 2000218308 | A | | 8/2000 |
| JP | 2006007233 | A | * | 1/2006 |
| JP | 2010255060 | A | * | 11/2010 |
| WO | 2018067554 | A1 | | 4/2018 |

* cited by examiner

STEEL ALLOY WORKPIECE AND A METHOD FOR MAKING A PRESS-HARDENED STEEL ALLOY COMPONENT

INTRODUCTION

The present disclosure generally relates to steel alloy workpieces for press hardening processes, and more specifically, to oxidation resistant steel alloy workpieces having a surface pattern for improved electrophoretic coating adhesion.

In the automotive applications, high strength steel alloys are transformed into complex shapes by hot stamping, also referred to as press hardening. Structural parts such as the B-pillar of an automotive body are manufactured from steel blanks, also known as workpieces, which are cut and trimmed from steel sheets into predetermined shapes and sizes. These workpieces are heated in a furnace at a predetermined temperature and time, hot stamped within a die into a predetermined part configuration, and then quenched to achieve the desired structural properties. High strength steel automotive parts that are manufactured by a press hardening process are known as press hardened steel (PHS) components.

Immediately or soon after manufacture, the PHS components are coated by an electrophoretic painting (e-coating) process to protect the PHS components from corrosion. A phosphating process may be required prior to the e-coating process to increase the adhesion of an e-coat onto the surface of the PHS component. During the press hardening process of a bare surface steel alloy workpiece, a thick non-homogenous oxide film may form on the surface, thus adversely impacting the adhesion of the e-coating. It is desirable to minimize oxidation on the surface of the workpieces throughout the process of transforming the workpieces into PHS components. An oxidation resistant coating, such as zinc (Zn), may be applied to the surfaces of the workpiece. However, PHS components manufactured with a Zn coating may also exhibit a non-homogeneous oxide layer on the surface. The non-homogeneous oxide layer is required to be removed by shot-blasting before the e-coat is applied to ensure a good adhesion of the e-coat onto the PHS components, thus also resulting in increased cost of manufacturing the PHS components.

Thus, while present steel alloy workpieces having oxidation resistant coatings achieve their intended purpose for forming a PHS component, there is a need for a steel alloy workpiece having sufficient surface oxidation resistant that would eliminate the need of an oxidation resistant coating.

SUMMARY

According to several aspects, a steel alloy workpiece having between about 1.0 and 5.0 weight percent chromium, between about 0.5 and 2.0 weight percent silicon, and a surface having a predetermined imprinted pattern is disclosed.

In an additional aspect of the present disclosure, the predetermined imprinted pattern ascribes a roughness of between about 1.0 micron and 2.5 micron onto the surface.

In another aspect of the present disclosure, the predetermined imprinted pattern comprises a plurality of intersecting waves.

In another aspect of the present disclosure, the plurality of intersecting waves includes a first plurality of nested sinusoidal waves extending parallel to an A-axis, and a second plurality of nested sinusoidal waves extending parallel to the A-axis. The second plurality of nested sinusoidal waves is out of phase with the first plurality of nested sinusoidal waves such that the second plurality of nested sinusoidal waves overlaps the first plurality of nested sinusoidal waves.

In another aspect of the present disclosure, the first plurality of nested sinusoidal waves and the second plurality of nested sinusoidal waves includes at least one of a same amplitude and a same frequency.

In another aspect of the present disclosure, the first plurality of nested sinusoidal waves is about 180 degrees out of phase with the second plurality of nested sinusoidal waves.

In another aspect of the present disclosure, the plurality of overlapping sinusoidal waves includes an average intersection distance ($d_{avg}$) of more than 0 but less than about 150 micrometers.

In another aspect of the present disclosure, the plurality of intersecting waves ascribe a roughness of approximately 1.5 micron onto the surface of the steel alloy workpiece.

In another aspect of the present disclosure, the steel alloy workpiece further includes from about 0.01 to 0.35 weight percent Carbon (C) and between about 0.0 to 3.0 weight percent Manganese (Mn).

In another aspect of the present disclosure, the predetermined pattern comprises a honey-comb pattern.

According to several aspects, a method of manufacturing an electrophoretic coated press harden steel (PHS) component is provided. The method includes providing a workpiece having a steel alloy comprising between about 1.0 and 5.0 weight percent chromium, and between about 0.5 and 2.0 weight percent silicon, wherein workpiece includes a surface having an imprinted predetermined surface pattern; heating the workpieces at a predetermined time and temperature; hot stamping the workpieces into the PHS component; quenching the PHS component at a predetermined quench rate; and e-coating the PHS component.

In an additional aspect of the present disclosure, the imprinted predetermined surface pattern includes at least one of a plurality of intersecting waves and a honey-comb pattern.

In another aspect of the present disclosure, the plurality of intersecting waves includes a plurality of overlapping nested sinusoidal waves.

In another aspect of the present disclosure, the plurality of overlapping nested sinusoidal waves ascribe a roughness of approximately 1.5 micron onto the surface of the steel alloy workpiece.

In another aspect of the present disclosure, the steel alloy further includes from about 0.01 to 0.35 weight percent Carbon (C) and between about 0.0 to 3.0 weight percent Manganese (Mn).

In another aspect of the present disclosure, the e-coating is applied directly onto the stamped predetermined surface pattern of the workpiece.

According to several aspects, a press harden steel (PHS) component is disclosed. The PHS component includes a steel alloy substrate comprising between 1 and 5 weight percent chromium, and between about 0.5 and 2 weight percent silicon; a predetermined pattern imprinted on a surface of the steel alloy substrate; and a coating in direct contact with the surface.

In an additional aspect of the present disclosure, the predetermined pattern ascribes a roughness of between about 1.0 microns and 2.5 microns onto the surface.

In an additional aspect of the present disclosure, the coating is an e-coating.

In another aspect of the present disclosure, the predetermined pattern includes at least one of a plurality of overlapping waves and a honey-comb pattern.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views.

DETAILED DESCRIPTION

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale and some features may be exaggerated or minimized to show details of particular features. The specific structural and functional details disclosed are not intended to be interpreted as limiting, but as a representative basis for teaching one skilled in the art as to how to practice the disclosed concepts.

The present disclosure provides a steel alloy workpiece having a sufficient chromium (Cr) and silicon (Si) content such that the steel alloy workpiece exhibits a thin surface oxide film after the steel alloy workpiece is subjected to the process of press hardening to form a press hardened steel (PHS) component. Furthermore, the steel alloy workpiece also includes a surface having an imprinted pattern that is favorable for the improved adhesion of an electrophoretic coating (e-coat) onto the manufactured PHS component. The present disclosure also provides a method of manufacturing an e-coated PHS component from the presently disclosed steel alloy workpiece and an e-coated PHS component formed with the disclosed method.

Figure 1:
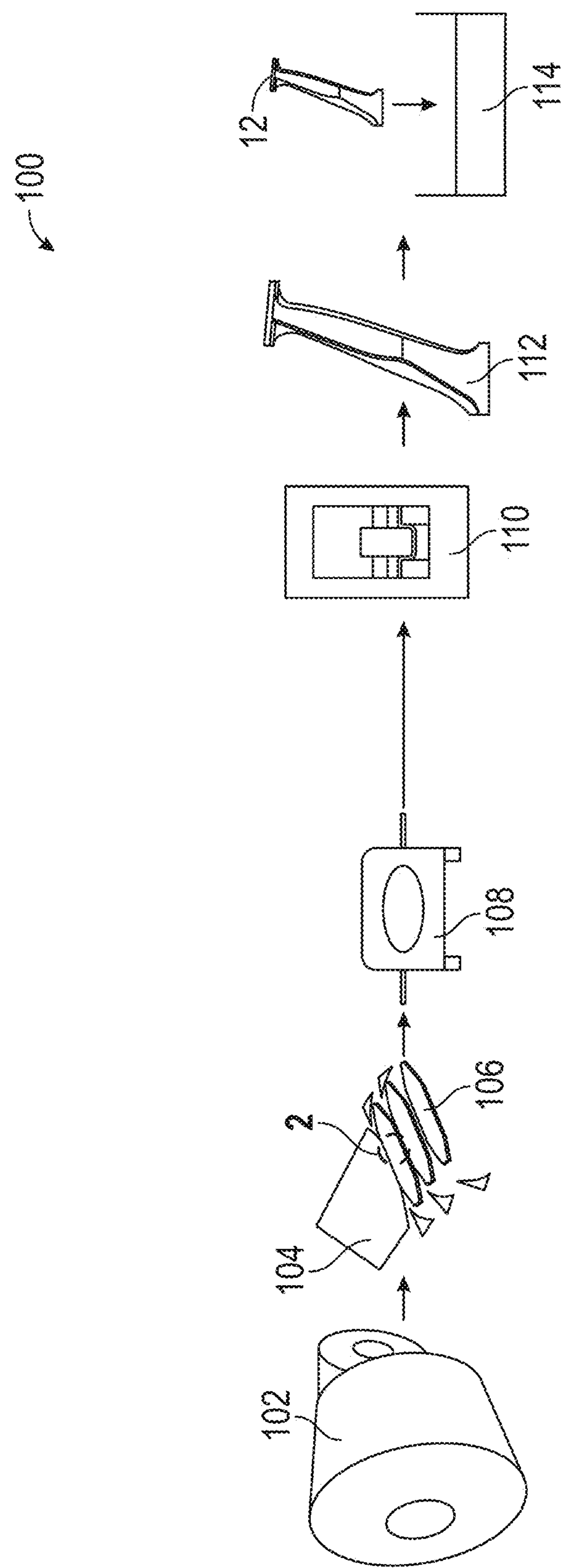
FIG. 1 is a schematic illustration of a process flow of a method for manufacturing a press hardened steel (PHS) component, according to an exemplary embodiment.

FIG. 1 shows a process flow of a method, generally indicated by reference numeral 100, of manufacturing an e-coated PHS component from a steel alloy workpiece 106 having a novel steel alloy composition and imprinted surface pattern as disclosed in detail below. The method 100 begins by providing a coil 102 of a steel alloy sheet 104; unrolling and cutting the steel alloy sheet 104 into a plurality of workpieces 106 having a predetermined size and shape; heating the workpieces 106 in a furnace 108 at a predetermined time and temperature; hot stamping the workpieces 106 in a die 110 into a PHS component 112; quenching the PHS component 112 at a predetermined quench rate; and e-coating the PHS component 112 by phosphating and immersing the PHS component 112 into a bath 114 of an e-coating emulsion. The e-coating is applied directly onto the imprinted surface pattern remaining on the PHS component 112. The unique combination of steel alloy composition and surface patterning provides a very dense and thin surface oxide film; thus providing a superior surface for the adhesion of an e-coating without the need for an oxidation resistant coating on the workpiece 106.

The predetermined shape and size of the workpiece 106 is based on the desired dimensions of the finished PHS component 112. For example, the workpiece 106 can be made into an automotive structural component, such as a B-pillar 112 as shown in FIG. 1. It should be appreciated that the workpiece 106 can be also made into other industrial components according to the principle of the present disclosure. The predetermined time and temperature for heating the workpiece 106, as well as the rate of quenching, is based on the desired physical properties of the finished PHS component. For the exemplary B-pillar 112, it is desirable to heat the workpiece 106 at a time and temperature such that the steel alloy of the workpiece 106 transforms to an austenization state. The hot workpiece 106 is then quenched at a rate sufficient to achieve a high strength B-pillar 112.

The composition of the steel alloy sheet from which the workpiece 106 is cut contains between about 0.01 and 0.35 weight percent Carbon (C), between about 0.0 to 3.0 weight percent Manganese (Mn), between about 1.0 and 5.0 weight percent Chromium (Cr), and between about 0.5 and 2.0 weight percent Silicon (Si). The weight percent of Cr and Si of the steel alloy sheet of the present disclosure is respectively higher than that of a conventional steel alloy, such as 22MnB5 steel alloy, the composition of which includes about 0.15 weight percent Cr and 0.25 weight percent Si. A comparison Table A comparing selected elemental contents of the disclosed steel alloy and the typical 22MnB5 steel alloy is shown below:

TABLE A

| Grade | Coating | C (%) | Mn (%) | Cr (%) | Si (%) | Other elements (%) |
|---|---|---|---|---|---|---|
| 22MnB5 (typical) | Al—Si | 0.23 | 1.2 | 0.15 | 0.25 | B = ~0.003 |
| New | N/A | 0.01-0.35 | 0.0-3.0 | 1-5 | 0.5-2 | Mo <0.8, Ni <1, Cu <1 B <0.005, Nb <0.3, V <0.6 |

In Table A, "Grade" represents the grade of steel alloy; "C" represents carbon; "Mn" represents manganese; "B" represents boron; "Mo" represents Molybdenum; "Ni" represents nickel; "Cu" represents copper; "Nb" represents niobium; and "V" represents vanadium.

Figure 2:
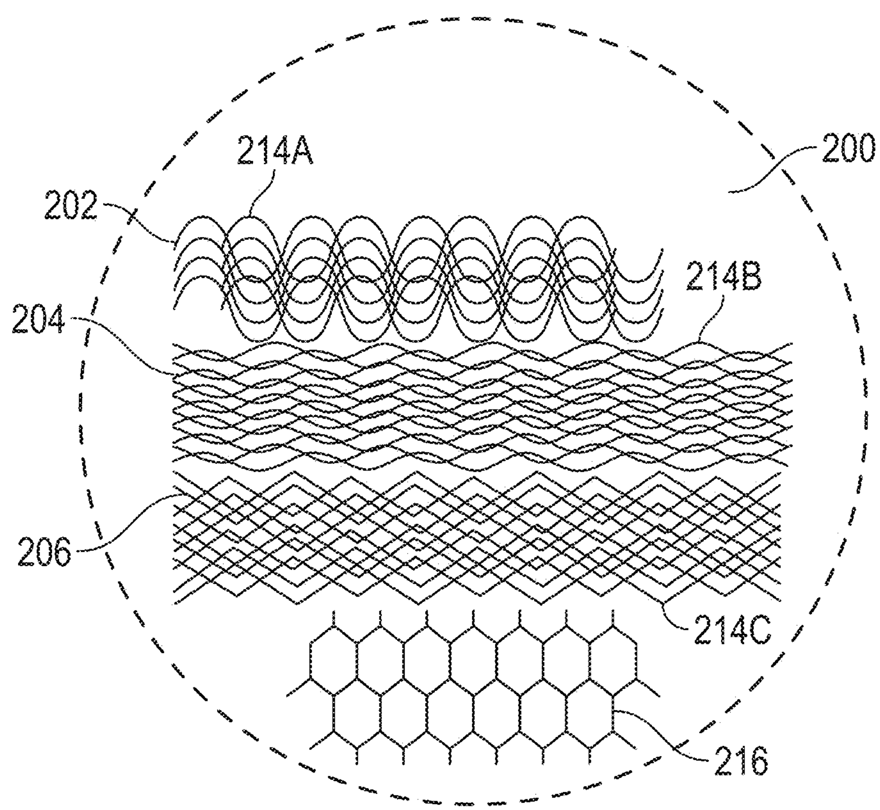
FIG. 2 is a schematic illustration of a detailed view 2 of a portion of a surface of a workpiece of FIG. 1 having exemplary surface patterns, according to an exemplary embodiment.
Figure 3A:
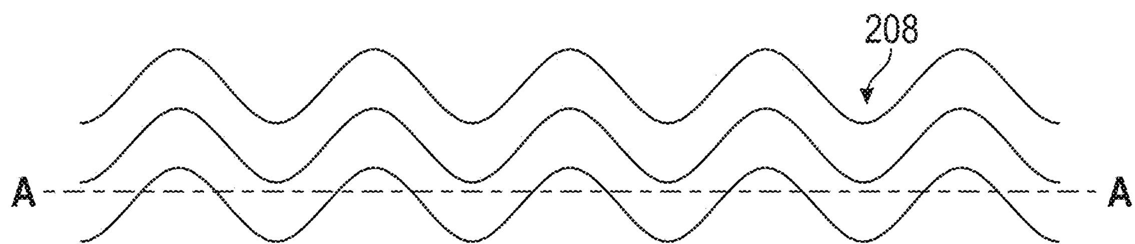
FIG. 3A shows an exemplary surface pattern of a first plurality of nested undulating waves extending in a direction parallel to an axis-A.
Figure 3B:
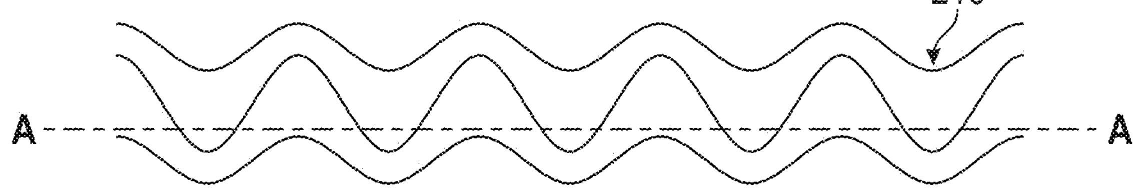
FIG. 3B shows an exemplary surface pattern of a second plurality of nested sinusoidal waves extending in a direction parallel to the axis-A.
Figure 3C:
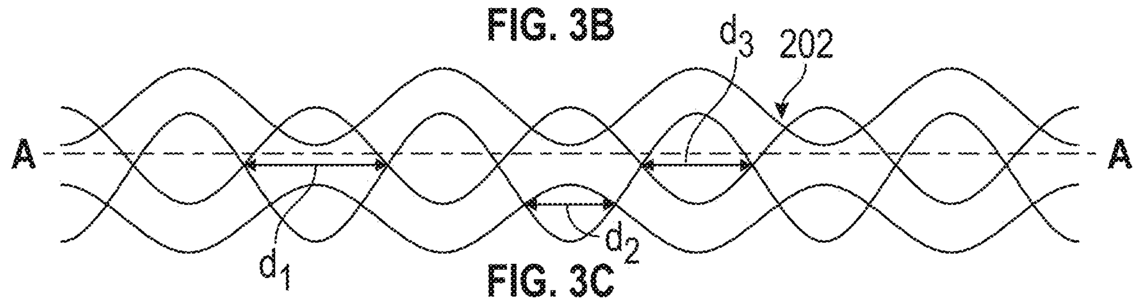
FIG. 3C shows the first plurality of nested sinusoidal waves of FIG. 3A superimposed onto the second plurality of nested adjacent sinusoidal waves of FIG. 3B.

Referring to FIG. 2, an enlarged view (2) of a portion of a surface 200 of the steel alloy workpiece 106 of FIG. 1 is shown. FIG. 2 shows the surface 200 imprinted with three (3) exemplary overlapping wave patterns 202, 204, 206. FIGS. 3A-3C shows a deconstruction of the first exemplary overlapping wave pattern 202. The disclosure of the deconstruction of the first exemplary overlapping wave pattern 202 is also applicable to the second exemplary overlapping wave pattern 204 and third exemplary overlapping wave pattern 206. Alternatively, the surface 200 may be imprinted with a honey-comb pattern 216. The imprinted patterns 202, 204, 206, 216 ascribes a roughness of between about 1.0 and 2.5 micron onto the surface 200 or the steel alloy work piece, with an average roughness of about 1.5 micron.

Referring to FIG. 3A, a first plurality of nested undulating waves 208 are shown extending in a direction parallel to an axis-A. The nested undulating waves 208 may be those of sinusoidal waves 208. The axis-A may extend along the length, width, or angular relative to the workpiece 106. Each of the first plurality of nested sinusoidal waves 208 may include a same frequency and amplitude. Referring to FIG. 3B, a second plurality of nested sinusoidal waves 210 are shown extending in a direction parallel to the axis-A, which is the same axis-A as FIG. 3A. The second plurality of nested sinusoidal waves 210 may have the same frequency and amplitude as that of the first plurality of nested sinusoidal waves 208, but are 180 degrees out of phase with the first plurality of nested sinusoidal wave 208. Alternatively, the second plurality of nested sinusoidal waves 210 may have different frequency and amplitude as that of the first plurality of nested sinusoidal waves 208. Referring to FIG. 3C, the first plurality of nested sinusoidal waves 208 are superimposed onto the second plurality of nested adjacent sinusoidal waves 210 thus forming the first exemplary overlapping wave pattern 202.

Still referring to FIG. 3C, the first exemplary overlapping wave pattern 202 defines a plurality intersection distances (d1, d2, d3, etc.) along the axis-A, also referred to a pining length. The average $d_{avg}$ of the plurality intersection distances d1, d2, d3, etc is more than 0 and less than about 150 microns (um). An intersection distance (d) is defined as a distance between adjacent intersections of the overlapping wave pattern 202 along the axis-A. The overlapping wave pattern 202 ascribes a minimal roughness of approximately 1 micron (um) onto the surface of the workpiece 106. Laboratory results have shown that the combination of the novel composition of the steel alloy workpiece 106 in conjunction with the overlapping wave patterns imprinted onto the surface of the workpiece 106 provides a finished PHS component that has superior e-coating adhesion as compared to traditional steel alloys having an oxidation resistant coating.

Referring back to FIG. 2, first exemplary overlapping wave pattern 202 includes a higher frequency as compared to the second exemplary overlapping wave pattern 204 and the third exemplary overlapping wave pattern 206. The first exemplary overlapping wave pattern 202 and second exemplary overlapping wave pattern 204 include amplitude peaks having rounded transitions 214A, 214B. The third exemplary overlapping wave pattern 206 include amplitude peaks having sharp transitions 214C forming a zigzag or triangular wave pattern. The three sets of overlapping sinusoidal waves are presented as examples and are not meant to be so limited.

Figure 4A:
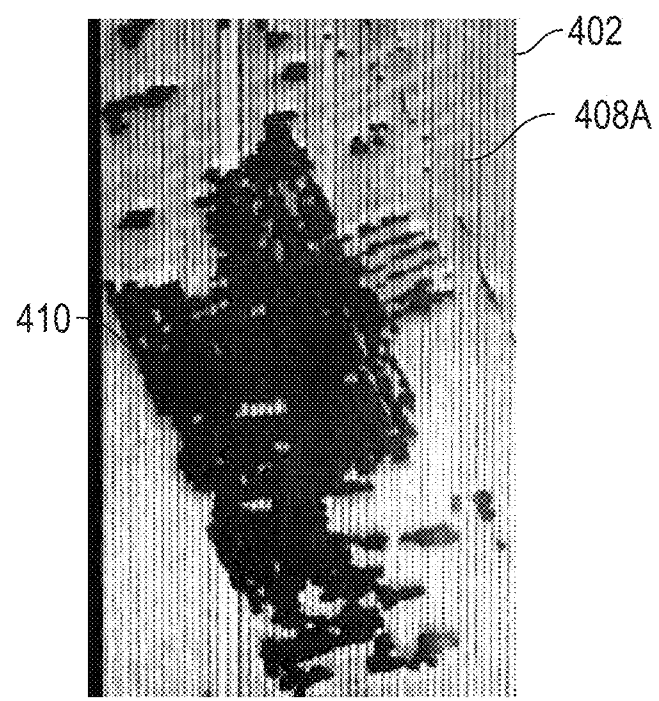
FIG. 4A is a picture of a surface of a laboratory reference workpiece showing the result of a tape adhesion test.
Figure 4B:
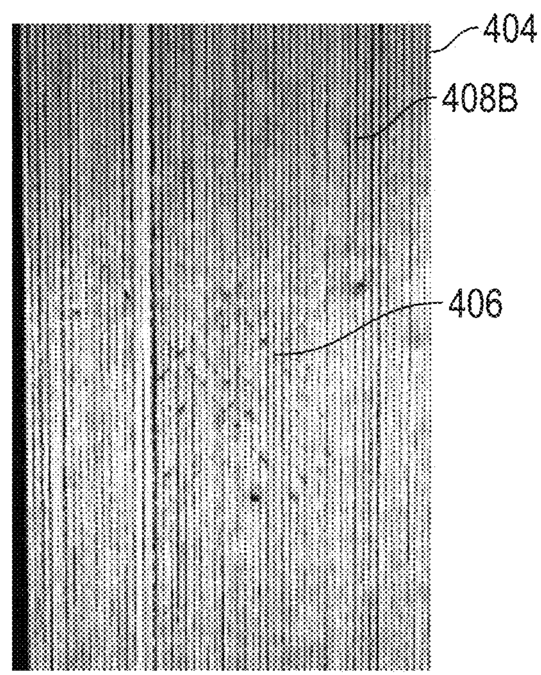
FIG. 4B is a picture of a surface of a laboratory test workpiece showing the result of a tape adhesion test.

FIGS. 4A-4B are photographs depicting results of an industrial standard crosshatch test, also referred to as a tape adhesion test, conducted on an e-coated steel alloy without a surface pattern (Reference Workpiece 402) and on an e-coated steel alloy with an imprinted surface pattern (Test Workpiece 404), respectively. Both the steel alloys of Reference Workpiece 402 and Test Workpiece 404 include a composition of about 0.01 and 0.35 weight percent Carbon (C), between about 0.0 to 3.0 weight percent Manganese (Mn), between about 1.0 and 5.0 weight percent Chromium (Cr), and between about 0.5 and 2.0 weight percent Silicon (Si). The crosshatch test includes making crosshatch cuts 406 with a sharp cutting tool through the e-coating 408, brushing the e-coating with a soft bristle brush to remove detached flakes or ribbons of coating, covering the crosshatch cuts 406 with a strip of tape, and removing the tape in a rapid jerking motion perpendicular to the paint film.

Referring to FIG. 4A, the Reference Workpiece 402 did not include an overlapping wave pattern on the surface. The Reference Workpiece 402 was press hardened and then e-coated. The result of the tape adhesion test shows flaking of the lighter colored e-coating 408 exposing the darker colored steel alloy substrate 410. Referring to FIG. 4B, the Test Workpiece included the same alloy composition of the Reference Workpiece 402, but also includes an overlapping wave pattern imprinted on the surface. The Test Workpiece 404 was also press hardened and then e-coated. The result of the tape adhesion test shows no flaking of the lighter colored e-coating, thus indicating good adhesion of the e-coating onto the higher Cr and Si content steel alloy substrate. The positive test results of the Test Sample show that the press-hardened Test Workpiece 402 having a dense and thin surface oxide with a wave pattern on the surface provides a superior surface for the adhesion of an e-coating.

Figure 5:
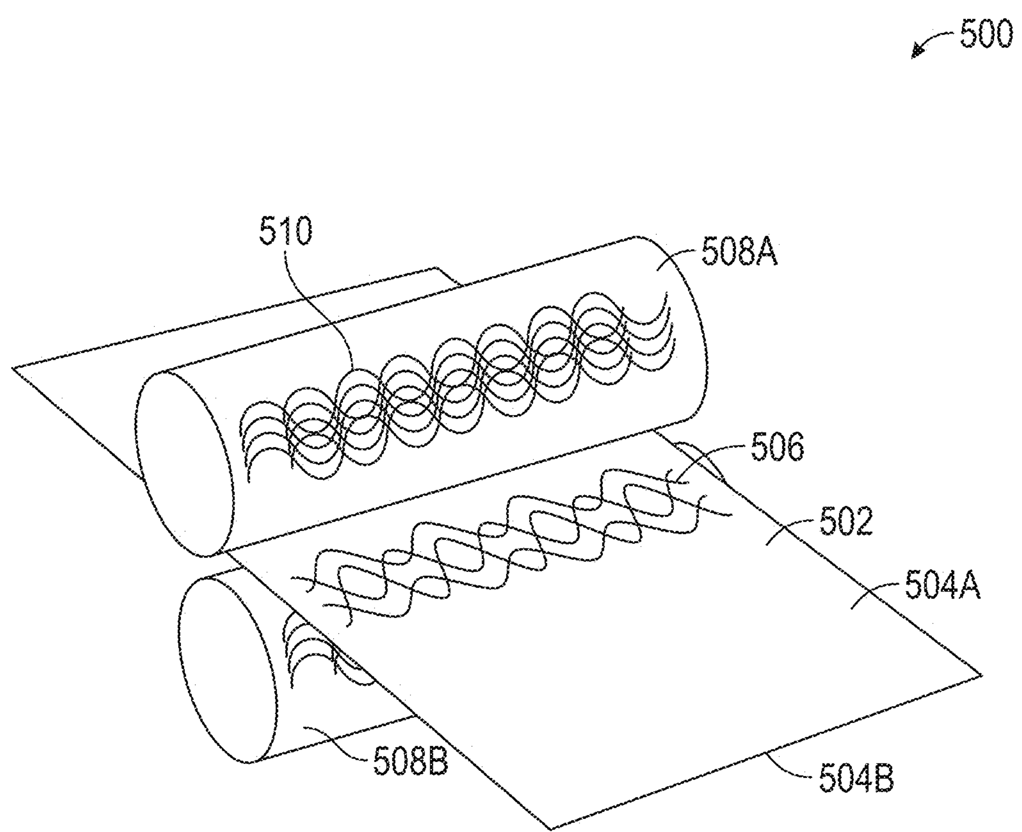
FIG. 5 is a schematic illustration of a method of manufacturing a steel alloy sheet having an overlapping wave pattern, according to an exemplary embodiment.

FIG. 5 shows a method, indicated generally by reference number 500, of manufacturing a steel alloy sheet 502. The steel alloy sheet includes a first surface 504A and an opposing second surface 504B. At least one of the first surface 504A and second surface 504B includes an imprinted overlapping wave pattern 506. The steel alloy sheet 502 includes a composition of about 0.01 and 0.35 weight percent Carbon (C), between about 0.0 to 3.0 weight percent Manganese (Mn), between about 1.0 and 5.0 weight percent Chromium (Cr), and between about 0.5 and 2.0 weight percent Silicon (Si). The steel alloy sheet is pressed rolled between a first roller 508A and a second roller 508B to imprint the overlapping wave pattern 506 into the surface 504A, 504B of the steel alloy sheet. At least one of the first and second roller includes a relief die pattern 510 of a mirror image of the plurality of overlapping wave 506. The first roller 508A cooperates with the second roller 508B to exert a sufficient pressure onto the first and second surfaces 504A, 504B of the steel alloy sheet such that the overlapping wave pattern 506 is imprinted onto at least of the first and second surfaces of the steel alloy sheet. The relief die pattern 510 on the rollers can be created by a computer controlled laser cutting process. The relief die pattern is configured to provide an average roughness (Ra) of approximately about 1.0 to 2.5 um, with an average of about 1.5 urn, onto the surfaces 504A, 504B of the steel alloy sheet.

The above disclosure provides for a steel alloy that is advantages for manufacturing an e-coated PHS component. The disclosed composition provides a thin, but dense, surface oxide film which when combined with the above disclosed surface pattern provides a PHS component having a surface finish that has superior e-coat adhesion.

Numerical data have been presented herein in a range format. "The term "about" as used herein is known by those skilled in the art. Alternatively, the term "about" includes +/−0.05% by weight". It is to be understood that this range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. While examples have been described in detail, those familiar with the art to which this disclosure relates will recognize various alternative designs and examples for practicing the disclosed method within the scope of the appended claims.

While the invention has been described in connection with one or more embodiments, it should be understood that the invention is not limited to those embodiments. On the contrary, the invention covers all alternatives, modifications and equivalents as may be included within the spirit and scope of the appended claims.

What is claimed is:

1. A steel alloy workpiece, comprising:
between about 1.0 and 5.0 weight percent chromium;
between about 0.5 and 2.0 weight percent silicon;
a surface having a predetermined imprinted pattern comprising a plurality of imprinted intersecting waves having an average intersection distance ($d_{avg}$) of more than 0 but less than about 150 micrometers; and
an electrophoretic coating applied directly onto the imprinted surface; and
wherein the steel alloy workpiece is press hardened.

2. The steel alloy workpiece of claim 1, wherein the predetermined imprinted pattern ascribes a roughness of between about 1.0 micron and 2.5 micron onto the surface.

3. The steel alloy workpiece of claim 1, wherein the plurality of intersecting waves comprises:
a first plurality of nested sinusoidal waves extending parallel to an A-axis; and
a second plurality of nested sinusoidal waves extending parallel to the A-axis;
wherein the second plurality of nested sinusoidal waves is out of phase with the first plurality of nested sinusoidal waves such that the second plurality of nested sinusoidal waves overlaps the first plurality of nested sinusoidal waves.

4. The steel alloy workpiece of claim 3, wherein the first plurality of nested sinusoidal waves and the second plurality of nested sinusoidal waves includes at least one of a same amplitude and a same frequency.

5. The steel alloy workpiece of claim 3, wherein the first plurality of nested sinusoidal waves is about 180 degrees out of phase with the second plurality of nested sinusoidal waves.

6. The steel alloy workpiece of claim 1, wherein the plurality of intersecting waves ascribe a roughness of about 1.5 micron onto the surface of the steel alloy workpiece.

7. The steel alloy workpiece of claim 1, further comprising:
from about 0.01 to about 0.35 weight percent Carbon (C); and
more than 0.0 to about 3.0 weight percent Manganese (Mn).

8. The steel alloy workpiece of claim 1, wherein the predetermined imprinted pattern comprises a honey-comb pattern.

* * * * *